(12) United States Patent
Yamaguchi et al.

(10) Patent No.: US 11,602,936 B2
(45) Date of Patent: Mar. 14, 2023

(54) INKJET PRINTING APPARATUS AND STORAGE MEDIUM STORING PROGRAM

(71) Applicant: BROTHER KOGYO KABUSHIKI KAISHA, Nagoya (JP)

(72) Inventors: Masatomo Yamaguchi, Inazawa (JP); Shoko Kodama, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 239 days.

(21) Appl. No.: 17/037,923

(22) Filed: Sep. 30, 2020

(65) Prior Publication Data

US 2021/0094318 A1    Apr. 1, 2021

(30) Foreign Application Priority Data

Sep. 30, 2019  (JP) .............................. JP2019-180323

(51) Int. Cl.
*B41J 2/045* (2006.01)
*B41J 3/01* (2006.01)
*B41J 2/51* (2006.01)
*G06K 7/14* (2006.01)

(52) U.S. Cl.
CPC ............. *B41J 3/01* (2013.01); *B41J 2/04551* (2013.01); *B41J 2/04563* (2013.01); *B41J 2/512* (2013.01); *G06K 7/1456* (2013.01)

(58) Field of Classification Search
CPC ........................................................ B41J 3/01
See application file for complete search history.

(56) References Cited

U.S. PATENT DOCUMENTS

| | | | |
|---|---|---|---|
| 2006/0017758 A1* | 1/2006 | Nambudiri | G07B 17/00508 347/14 |
| 2006/0125903 A1* | 6/2006 | Fogarty | B41J 3/01 347/107 |
| 2019/0095155 A1* | 3/2019 | Mizutani | G06F 3/1253 |
| 2020/0304680 A1* | 9/2020 | Kobayashi | H04N 1/00334 |

FOREIGN PATENT DOCUMENTS

| | | |
|---|---|---|
| JP | H11-179894 A | 7/1999 |
| JP | 2006-321065 A | 11/2006 |
| JP | 2009272667 A * | 11/2009 |

* cited by examiner

*Primary Examiner* — Shelby L Fidler
(74) *Attorney, Agent, or Firm* — Scully, Scott, Murphy & Presser, PC (57) ABSTRACT

A controller extracts an image resolution in a first direction of image data stored in a memory; determines, based on the image data, whether a code image is included in an image to be printed on a recording medium, the code image being formed with a plurality of print regions and a plurality of non-print regions; in response to determining that the code image is included, determines whether a print resolution in the first direction is lower than the extracted image resolution in the first direction; in response to determining that the print resolution is lower than the extracted image resolution, updates the print resolution in the first direction with a value equal to or higher than the extracted image resolution in the first direction; and controls a print engine to perform printing on the recording medium with the updated print resolution in the first direction.

18 Claims, 9 Drawing Sheets

INKJET PRINTING APPARATUS AND STORAGE MEDIUM STORING PROGRAM

CROSS REFERENCE TO RELATED APPLICATIONS

This application claims priority from Japanese Patent Application No. 2019-180323 filed Sep. 30, 2019. The entire content of the priority application is incorporated herein by reference.

TECHNICAL FIELD

This disclosure relates to an inkjet printing apparatus configured to print a code image and a storage medium storing program.

BACKGROUND

The standard for one-dimensional codes (bar codes) defines the ratio of the width of a bar and the space between two adjacent bars. If the ratio of the width of the bar and the space of the printed barcode image is out of the reference range, a reading error will occur. In order to prevent a reading error, when printing a barcode image on a recording medium such as paper, it is necessary to ensure the print quality of the barcode image so that the ratio of the width of the bar and the space is within the reference range. This also applies to two-dimensional codes.

For example, there is disclosed an inkjet recording apparatus that performs printing while selecting a head for recording large dots for a solidly recorded area and selecting a head for recording small dots for a finely recorded area such as a barcode, based on information read from a recording medium. In addition, there is disclosed an inkjet printing apparatus including control means for reducing the amount of ink ejection of an inkjet print head when the presence of barcode information in print image information is detected. These techniques reduce the amount of ink ejection for a barcode image and suppress the bars from becoming excessively thick, thereby securing the print quality of barcode images.

SUMMARY

According to one aspect, this specification discloses an inkjet printing apparatus. The inkjet printing apparatus includes a print engine, a memory, and a controller. The print engine includes a head having a plurality of nozzles configured to eject ink. The print engine is configured to print an image on a recording medium by ejecting ink from the plurality of nozzles while the head moves relative to the recording medium. The memory is configured to store image data and a print resolution in a first direction of an image to be printed on the recording medium. The controller is configured to: extract an image resolution in the first direction of image data stored in the memory; determine, based on the image data, whether a code image is included in an image to be printed on the recording medium, the code image being formed with a plurality of print regions and a plurality of non-print regions; in response to determining that the code image is included, determine whether the print resolution in the first direction stored in the memory is lower than the extracted image resolution in the first direction; in response to determining that the print resolution is lower than the extracted image resolution, update the print resolution in the first direction with a value equal to or higher than the extracted image resolution in the first direction; and control the print engine to print the image on the recording medium with the updated print resolution in the first direction.

According to another aspect, this specification also discloses a non-transitory computer-readable storage medium storing a set of program instructions for a computer of an electronic device that controls an inkjet printing apparatus. The inkjet printing apparatus includes a print engine including a head having a plurality of nozzles configured to eject ink. The print engine is configured to print an image on a recording medium by ejecting ink from the plurality of nozzles while the head moves relative to the recording medium. The set of program instructions, when executed by the computer, causes the electronic device to: extract an image resolution in a first direction of image data stored in a memory of the electronic device; determine, based on the image data, whether a code image is included in an image to be printed on the recording medium, the code image being formed with a plurality of print regions and a plurality of non-print regions; in response to determining that the code image is included, determine whether a print resolution in the first direction stored in the memory is lower than the extracted image resolution in the first direction; in response to determining that the print resolution is lower than the extracted image resolution, update the print resolution in the first direction with a value equal to or higher than the extracted image resolution in the first direction; and control the print engine to print the image on the recording medium with the updated print resolution in the first direction.

BRIEF DESCRIPTION OF THE DRAWINGS

Embodiments in accordance with this disclosure will be described in detail with reference to the following figures wherein.

DETAILED DESCRIPTION

Figure 9A:
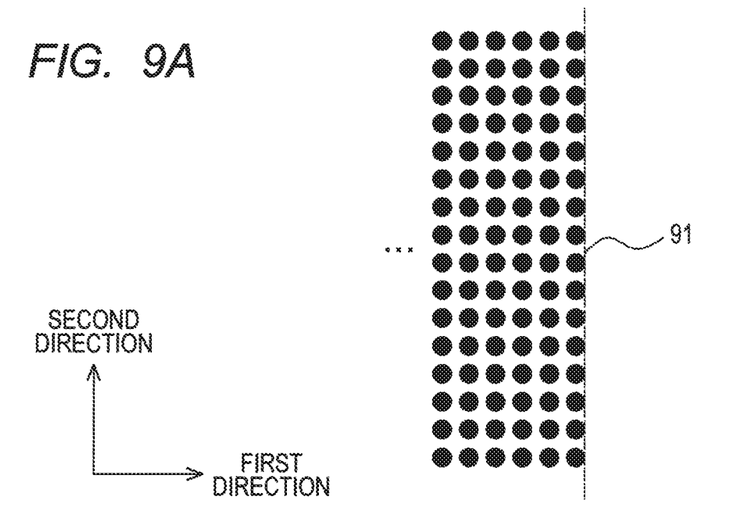
FIG. 9A is an explanatory diagram showing a dot row forming the vicinity of an edge of a bar in a case where a print resolution is equal to or higher than an image resolution.
Figure 9B:
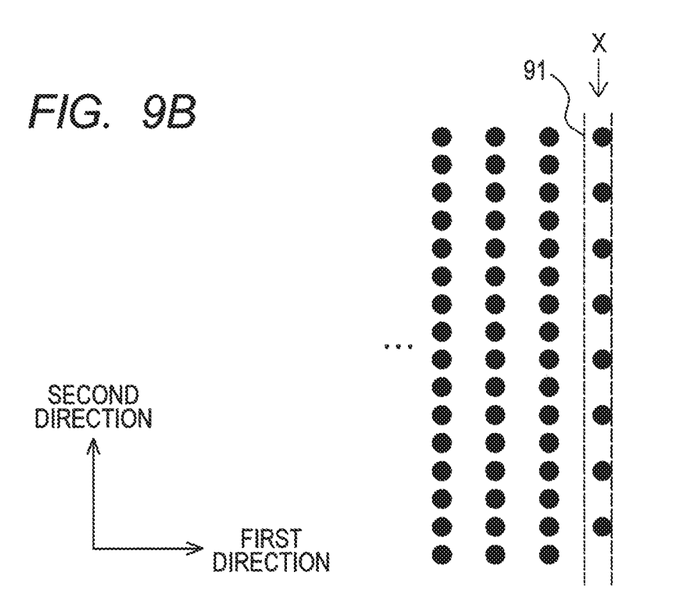
FIG. 9B is an explanatory diagram showing a dot row forming the vicinity of an edge of a bar in a case where the print resolution is lower than the image resolution.

There is a case that the print resolution of the image actually printed by a printer on a recording medium is lower than the image resolution of an original image data created and stored by a PC (personal computer) or stored in the memory of the printer. The inventor of this disclosure found that, in this case, a dot row forming a bar sometimes partially protrudes from an edge of the bar extending in a direction (second direction) perpendicular to the direction in Which the print resolution is defined (first direction). For example, when the print resolution in the first direction is equal to or higher than the image resolution in the first direction, as shown in FIG. 9A, a dot row is formed such that an edge 91 of the bar is located an appropriate position that the ratio of the bar and the space is within a reference range. When the print resolution in the first direction is lower than the image resolution in the first direction, as shown in FIG. 9B, the dot spacing in the first direction becomes wider. In this case, the dot row cannot be formed such that the edge of the bar is located at the above-described appropriate position (the position of the edge 91), and a dot row X partially protruding from the position of the edge 91 may be formed. The partial protrusion of the dot row X from the position of the edge 91 is caused by the image processing in the process of developing high resolution image data into low resolution print data to be supplied to the head. In this way, if a dot row is formed to protrude from the appropriate edge of the bar, the width ratio of the bar and the space of the bar code image in the printed image is out of the reference range, and a reading error may occur.

In view of the foregoing, an example of an object of the present disclosure is to provide an inkjet printing apparatus configured to secure the print quality of a code image in a case where the code image is included in image data, and a storage medium storing program.

A printer as an inkjet printing apparatus of some embodiments of this disclosure will be described while referring to the accompanying drawings.

First Embodiment

Figure 1:
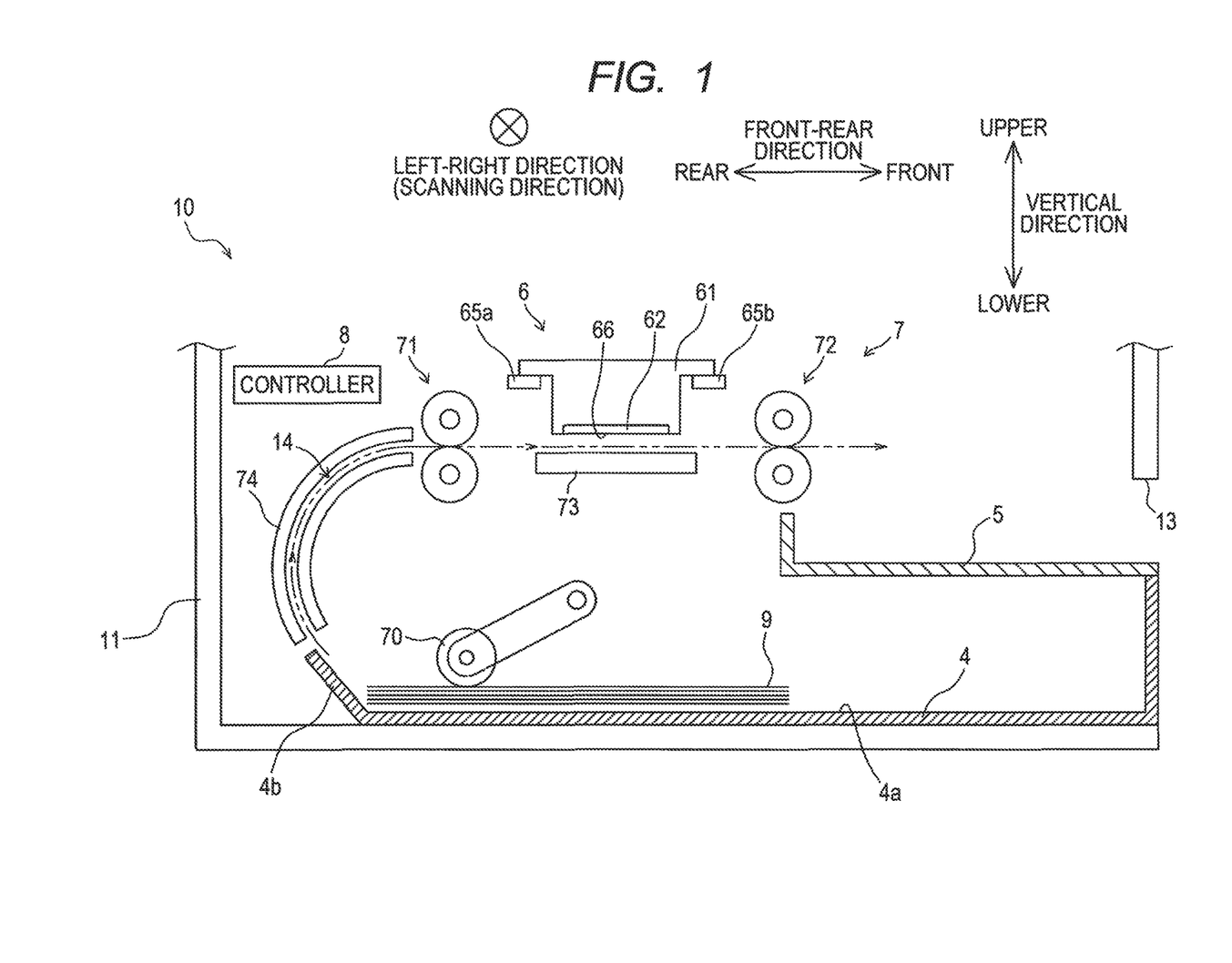
FIG. 1 is a schematic side view showing the internal structure of a printer according to a first embodiment of this disclosure.

First, a printer 10 according to a first embodiment will be described. As shown in FIG. 1, the printer 10 includes a paper feed tray 4, a paper discharge tray 5, a printing unit (print engine) 6, a conveyance unit (conveyor) 7, and a controller 8. In the following description, a vertical direction is defined based on the state where the printer 10 is installed in a usable state (state of FIG. 1). A front-rear direction is defined assuming that the side where an opening 13 of a housing 11 is provided is the near side (front side). Further, a left-right direction is defined when viewed from the near side (front side) of the printer 10. The paper feed tray 4, the printing unit 6, the conveyance unit 7, and the controller 8 are housed in the housing 11 of the printer 10. The paper feed tray 4 is arranged below the printing unit 6 in the housing 11.

The paper feed tray 4 is configured to support and accommodate a plurality of sheets of paper 9 in a stacked state. The paper feed tray 4 is configured to be inserted into and removed from the housing 11 in the front-rear direction.

The paper feed tray 4 has a support surface 4a that supports the paper 9. An inclined plate 4b is provided at the rear end of the paper feed tray 4.

The paper discharge tray 5 accommodates the paper 9 on which an image is printed by a head 62 of the printing unit 6 described later. The paper discharge tray 5 is arranged above the front side of the paper feed tray 4, and is configured to move as the paper feed tray 4 is inserted into and removed from the housing 11.

The printing unit 6 includes a carriage 61 and the head 62. The carriage 61 is supported by two guide rails 65a and 65b. The two guide rails 65a and 65b are arranged to be separated from each other in the front-rear direction, and each of the guide rails 65a and 65b extends in the left-right direction. The carriage 61 is arranged to straddle the two guide rails 65a and 65b. The carriage 61 is driven by a carriage motor 31 (see FIG. 3) so as to reciprocate along the two guide rails 65a and 65b in the left-right direction which is the scanning direction.

Figure 2:
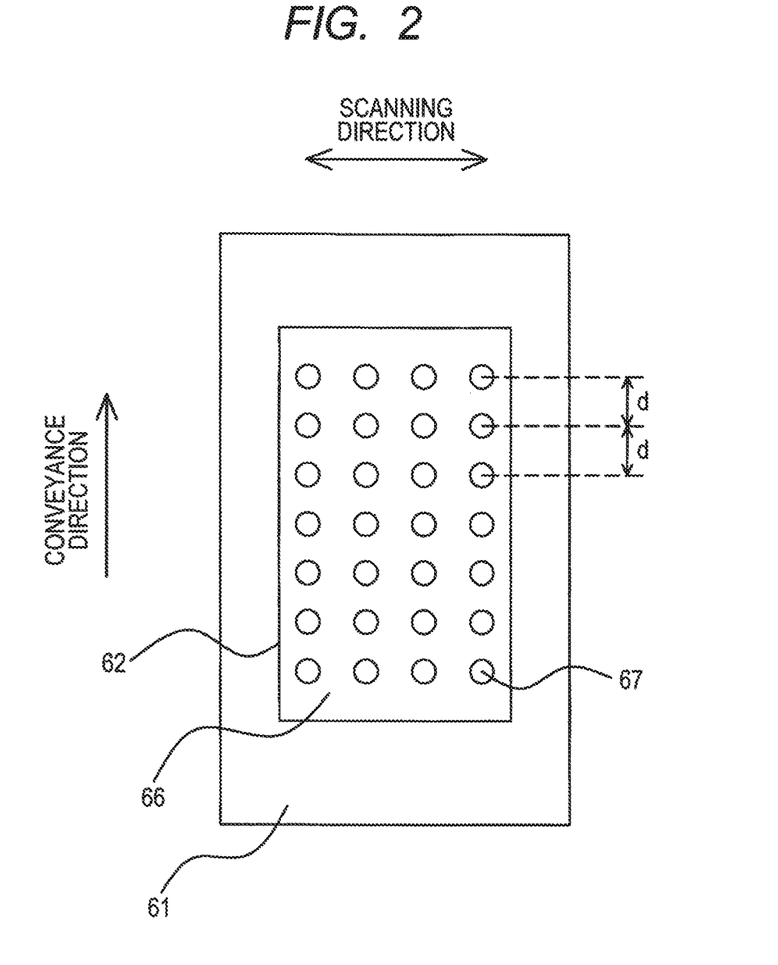
FIG. 2 is a view showing a lower surface of a head on which a plurality of nozzles is arranged.

The head 62 is mounted on the carriage 61 and reciprocates in the scanning direction together with the carriage 61. As shown in FIG. 2, a plurality of nozzles 67 for ejecting ink are arranged on a nozzle surface 66 on the lower surface of the head 62 at equal intervals along the conveyance direction (the front-rear direction) perpendicular to the scanning direction. That is, the distances between the two nozzles 67 adjacent to each other in the conveyance direction are all "d". The nozzles 67 are arranged on the nozzle surface 66 in four rows, the four rows being arranged in the scanning direction. The head 62 ejects ink supplied from four ink cartridges (not shown) that store ink of four colors (black, cyan, magenta, and yellow) from each row of the nozzles 67, thereby printing an image on paper 9. That is, the printer 10 in this embodiment is an inkjet serial printer capable of printing a color image.

The conveyance unit 7 conveys the paper 9 inside the printer 10, and includes a paper feed roller 70, a pair of conveyance rollers 71, a pair of discharge rollers 72, a platen 73, and a guide member 74. The paper feed roller 70 is disposed above the paper feed tray 4, and is rotated by being applied with a driving force from a paper feed motor 32 (see FIG. 3), thereby sending the paper 9 accommodated in the paper feed tray 4 rearward. The pair of conveyance rollers 71 and the pair of discharging rollers 72 are arranged to sandwich the printing unit 6 in the front-rear direction. The pair of conveyance rollers 71 is arranged at the rear of the printing unit 6, and the pair of discharge rollers 72 is arranged at the front of the printing unit 6. The pair of conveyance rollers 71 sends the paper 9 to a region facing the nozzle surface 66 of the head 62. The pair of discharge rollers 72 receives the paper 9 sent by the pair of conveyance rollers 71, and discharges the paper 9 to the paper discharge tray 5. The pair of conveyance rollers 71 and the pair of discharge rollers 72 are driven to rotate by a conveyance motor 33 (see FIG. 3).

The platen 73 is arranged below the printing unit 6 so as to face the nozzle surface 66 of the printing unit 6. The guide member 74 defines a conveyance path 14 for sending the paper 9 sent out from the paper feed tray 4 by the paper feed roller 70 to a region facing the nozzle surface 66 of the head 62. The guide member 74 extends from a position near the rear end of the paper feed tray 4 to a position near the pair of conveyance rollers 71.

The paper 9 fed rearward from the paper feed tray 4 by the paper feed roller 70 is directed obliquely upward by the inclined plate 4b provided at the rear end of the paper feed tray 4, passes through the conveyance path 14 defined by the guide member 74, and reaches a position Where the paper 9 is nipped by the pair of conveyance rollers 71. The paper 9 nipped by the pair of conveyance rollers 71 is conveyed to the region facing the nozzle surface 66 of the head 62 by the rotation of the pair of conveyance rollers 71. In a state where the paper 9 conveyed by the pair of conveyance rollers 71 is supported by the platen 73, ink is ejected from the nozzles 67 provided on the nozzle surface 66 of the head 62 that moves in the scanning direction so that an image is printed on the paper 9. The paper 9 on which the image is printed is conveyed forward by the pair of discharge rollers 72 and is discharged onto the discharge tray 5.

Figure 3:
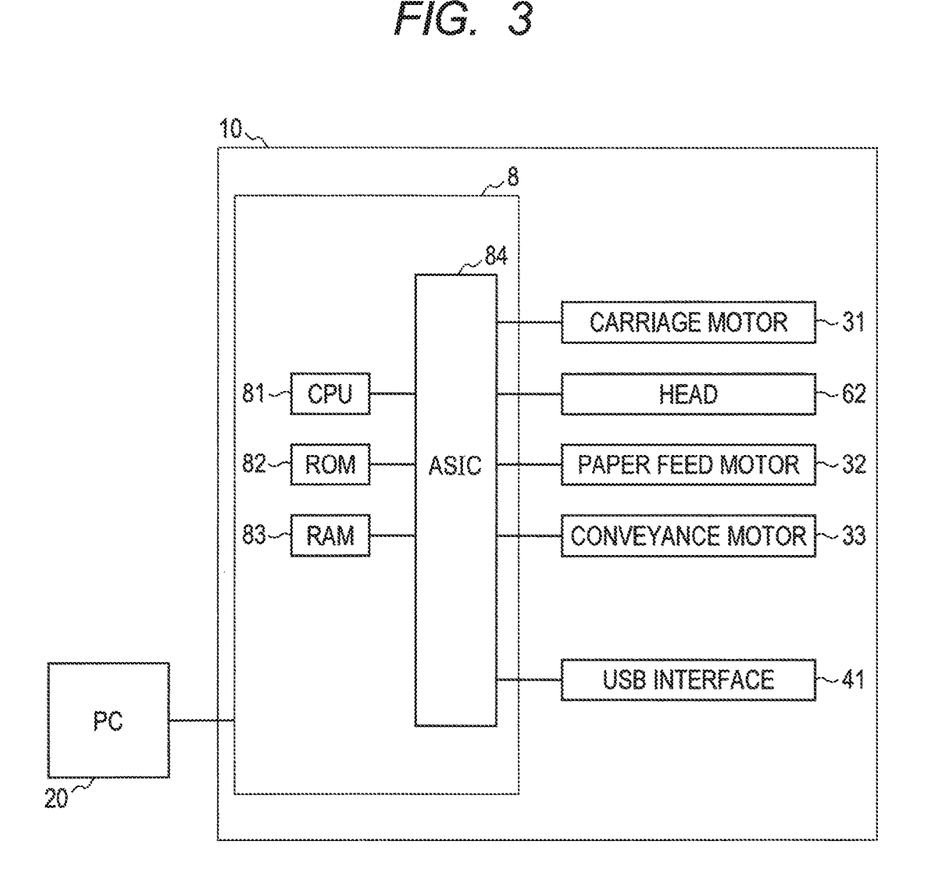
FIG. 3 is a block diagram schematically showing the electrical configuration of the printer shown in FIG. 1 and a PC connected to the printer.

The controller 8 controls the entire printer 10, and as shown in FIG. 3, the carriage motor 31, the head 62, the paper feed motor 32, the conveyance motor 33, and so on are electrically connected. Further, a USB interface 41 is electrically connected to the controller 8. The USB interface 41 is a USB standard interface and can be connected to a USB memory as a removable memory. In addition, a PC (Personal Computer) 20 that is an external device is connected to the controller 8 of the printer 10. The printer 10 and the PC 20 may be connected through a LAN (Local Area Network), or may be connected not through the LAN. Further, the data transmission/reception between the printer 10 and the PC 20 may be performed by wireless communication or wired communication. It is also possible to wirelessly connect a portable terminal such as a smartphone to the printer 10 through a LAN or directly.

The controller 8 includes a CPU (Central Processing Unit) 81, a ROM (Read Only Memory) 82, a RAM (Random Access Memory) 83, an ASIC (Application Specific Integrated Circuit) 84, and so on. The ROM 82 stores programs executed by the CPU 81 and the ASIC 84, various fixed data, and so on. Further, the ROM 82 includes a resolution storage section that preliminarily stores information on a plurality of print resolutions, that is, print resolutions (for example, 300 dpi, 600 dpi, 1200 dpi, 2400 dpi, and so on) in each of the conveyance direction and the scanning direction printed by the printer 10. In an initial state, one of the plurality of print resolutions for each of the conveyance direction and the scanning direction is set as the default print resolution that is to be used during printing. The RAM 83 includes an image data storage section that temporarily stores image data and so on necessary for executing the programs. At least part of the ROM 82 is an electrically erasable and rewritable EEPROM (Electrically Erasable Programmable Read-Only Memory). The PC 20 has a CPU, a ROM, a RAM, and an HDD (Hard Disk Drive), which are not shown. An OS (Operating System) and a printer driver are installed in the HDD. The CPU controls the operation of the printer 10 by executing the printer driver. The printer driver may be also installed in the ROM of the mobile terminal.

When image data is inputted from a USB memory connected to the USB interface 41 or from the PC 20, the controller 8 causes the CPU 81 and the ASIC 84 to execute prim processing based on the program stored in the ROM 82 and on the image data temporarily stored in the RAM 83. With this operation, an image 50 corresponding to the image data is printed on the paper 9. In the print processing, the controller 8 controls driving of the carriage motor 31 and the head 62 so as to perform a pass printing operation of ejecting ink from the nozzles 67 of the head 62 while moving the carriage 61 in the scanning direction based on the print resolution stored in the ROM 82 and on the image data stored in the RAM 83. Further, the controller 8 controls driving of the conveyance motor 33 such that, after the pass printing operation is performed twice, the conveyance unit 7 conveys the paper 9 by a particular distance in the conveyance direction. In the printer 10 according to this embodiment, in order to print the image 50 relating to inputted image data on the paper 9, the pass printing operation by the printing unit 6 and the conveyance operation of the paper 9 by the conveyance unit 7 are repeatedly executed.

Figure 4A:
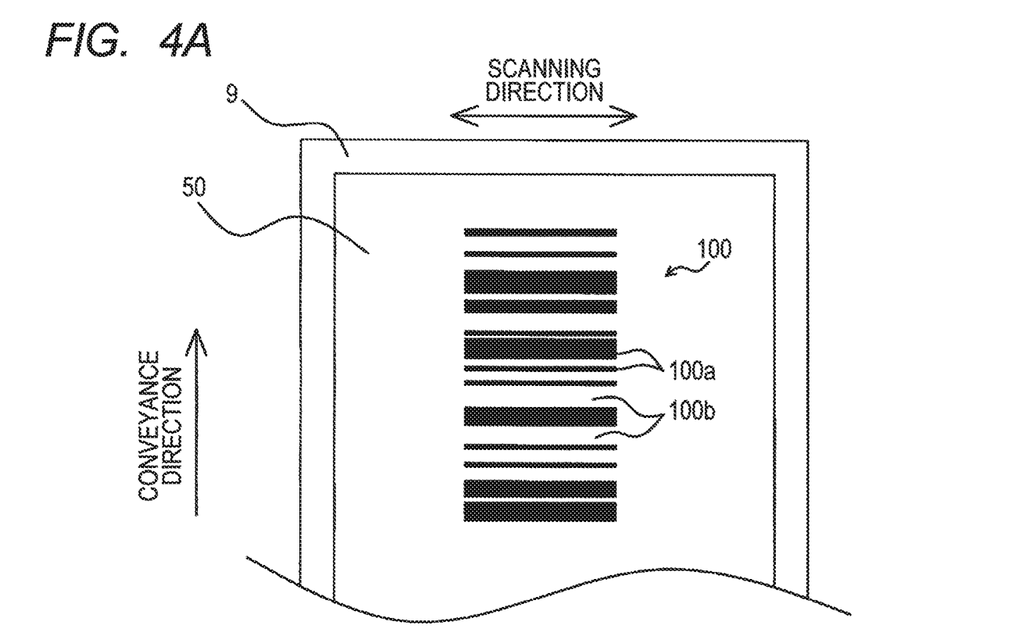
FIG. 4A is a diagram showing a state where a one-dimensional code image is arranged such that the longitudinal direction of the one-dimensional code image is parallel to the conveyance direction.
Figure 4B:
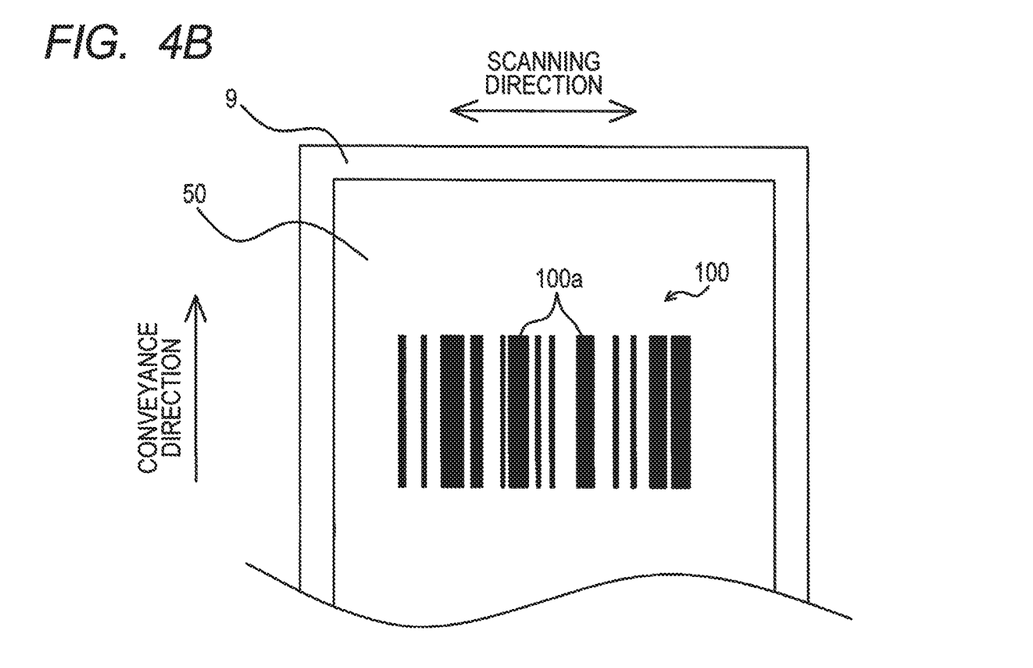
FIG. 4B is a diagram showing a state where a one-dimensional code image is arranged such that the longitudinal direction of the one-dimensional code image is perpendicular to the conveyance direction.

Image data which is the target of the present embodiment will be described. As shown in FIGS. 4A and 4B, the present embodiment is directed to image data relating to the image 50 including a one-dimensional code image 100 formed with a plurality of print regions 100a and a plurality of non-print regions 100b. In the present embodiment, regarding the one-dimensional code image 100, there is a case where, as shown in FIG. 4A, the one-dimensional code image 100 is printed in such an orientation that the facing direction (arrangement direction) in which adjacent print regions 100a face each other is the same as (parallel to) the conveyance direction, and there is a case where, as shown in FIG. 4B, the one-dimensional code image 100 is printed in such an orientation that the facing direction in which adjacent print regions 100a face each other is the same as (parallel to) the scanning direction. In FIG. 4A, the one-dimensional code image 100 is arranged such that the longitudinal direction of the one-dimensional code image 100 is parallel to the conveyance direction of the paper 9, whereas in FIG. 4B, the one-dimensional code image 100 is arranged such that the longitudinal direction of the one-dimensional code image 100 is perpendicular to the conveyance direction of the paper 9. The widths of the individual print regions 100a and the individual non-print regions 100b in the one-dimensional code image 100 differ according to the information that needs to be displayed in the one-dimensional code image 100. In the present embodiment, the one-dimensional code image 100 is a barcode.

Figure 5:
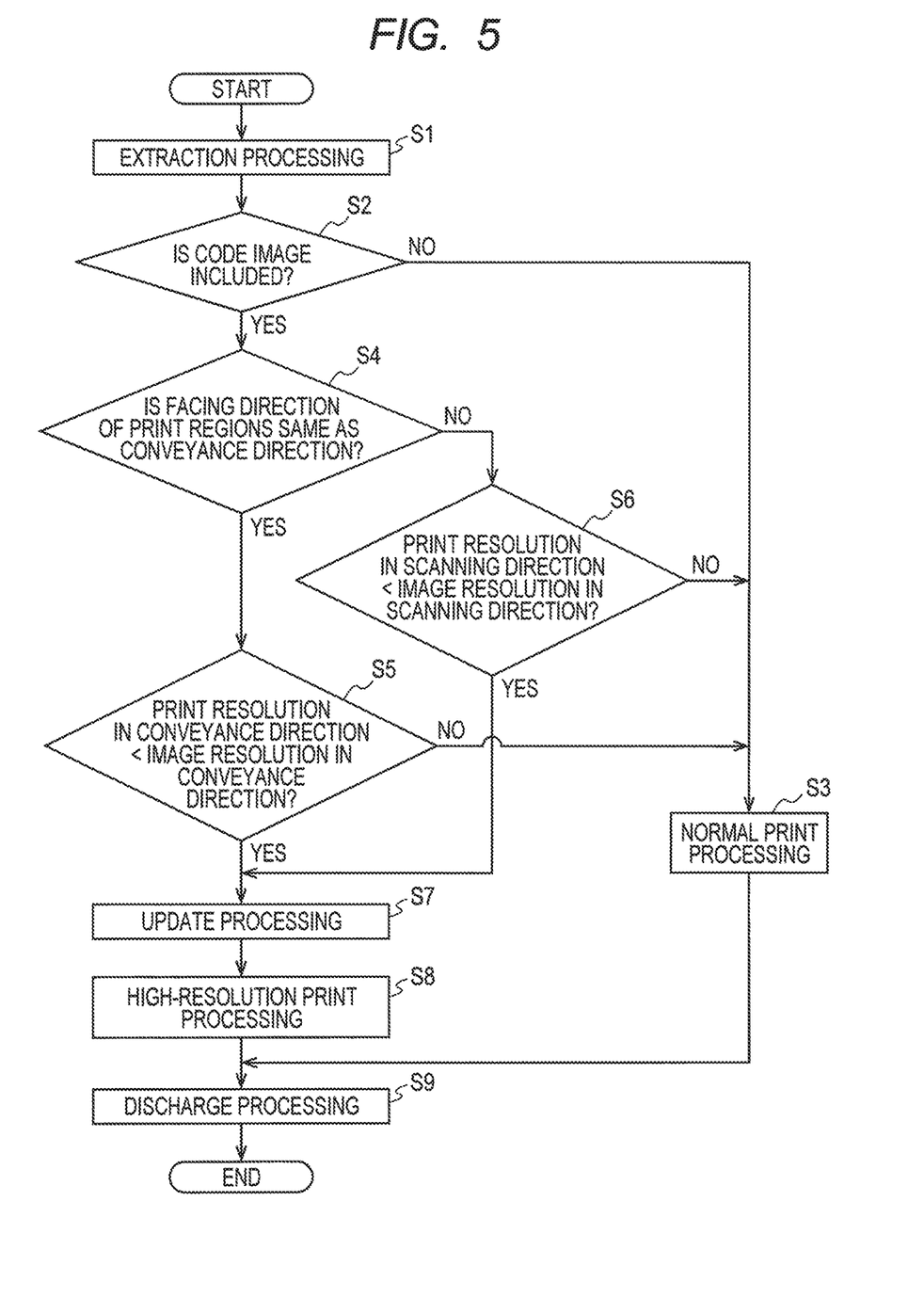
FIG. 5 is a flowchart showing the operations of an inkjet printer according to the first embodiment.

Next, the operation of the printer 10 according to the first embodiment when the printer 10 prints the image 50 on paper 9 will be described with reference to the flowchart of FIG. 5. First, a print command relating to the image data is supplied to the printer 10 based on the operation of an operation interface (not shown) of the printer 10 or the operation of the PC 20 by a user. The image data is supplied from the USB memory or the PC 20 to the printer 10 accordingly and is temporarily stored in the RAM 83. For each of the conveyance direction and the scanning direction, one print resolution included in the print command may be set as the print resolution to be used, instead of a default value. The controller 8 executes extraction processing of extracting the image resolution in the conveyance direction and in the scanning direction relating to the image data stored in the RAM 83 (step S1, "step" will be hereinafter abbreviated as "S"). The extraction processing may include, for example, referring to header information in the image file. Then, the controller 8 executes first determination processing of determining, based on the image data, Whether the one-dimensional code image 100 is included in the image 50 to be printed on the paper 9 (S2).

In response to determining that the one-dimensional code image 100 is not included in the image 50 to be printed on the paper 9 (S2: NO), the controller 8 executes normal print processing of printing the image 50 corresponding to the image data on the paper 9 by repeatedly performing a pass printing operation using the printing unit 6 and a conveyance operation of the paper 9 with the conveyance unit 7, based on the print resolution to be used for printing for each of the conveyance direction and the scanning direction and that is preliminarily stored in the ROM 82 (S3). In response to determining that the one-dimensional code image 100 is included in the image 50 to be printed on the paper 9 (S2: YES), the controller 8 executes second determination processing of determining in which one of the orientations shown in FIGS. 4A and 4B the one-dimensional code image 100 on the paper 9 is to be printed, and specifically determines whether the facing direction in which adjacent print regions 100a in the one-dimensional code image 100 face each other is the same as the conveyance direction (S4).

In response to determining that the facing direction in which the adjacent print regions 100a face each other is the same as the conveyance direction (S4: YES), the controller 8 performs third determination processing of determining whether the print resolution in the conveyance direction stored preliminarily in the ROM 82 is lower than the image resolution in the conveyance direction extracted in the extraction processing in S1 (S5).

When the print resolution in the conveyance direction is higher than the image resolution in the conveyance direction (S5: NO), the controller 8 repeatedly performs, based on the print resolution stored preliminarily in the ROM 82, the pass printing operation by the printing unit 6 and the conveyance operation of the paper 9 by the conveyance unit 7 to thereby perform normal print processing of printing, on the paper 9, the image 50 corresponding to the image data (S3). When the print resolution in the conveyance direction is lower than the image resolution in the conveyance direction (S5: YES), the controller 8 performs update processing of updating the print resolution in the conveyance direction with the same value as the image resolution in the conveyance direction (S7). For example, when the print resolution in the conveyance direction is 600 dpi and the image resolution in the conveyance direction is 1200 dpi, the controller 8 updates the print resolution in the conveyance direction to be 1200 dpi.

In response to determining that the facing direction of the adjacent print regions 100a is not the same as the conveyance direction (S4: NO) (that is, the facing direction of the adjacent print regions 100a is the same as the scanning direction), the controller 8 performs the third determination processing of determining whether the print resolution in the scanning direction stored preliminarily in the ROM 82 is lower than the image resolution in the scanning direction extracted in the extraction processing in S1 (S6).

When the print resolution in the scanning direction is higher than the image resolution in the scanning direction (S6: NO), the controller 8 performs the normal print processing of repeatedly performing, based on the print resolution stored preliminarily in the ROM 82, the pass printing operation by the printing unit 6 and the conveyance operation of the paper 9 by the conveyance unit 7 to thereby print, on the paper 9, the image 50 corresponding to the image data (S3). When the print resolution in the scanning direction is lower than the image resolution in the scanning direction (S6: YES), the controller 8 performs the update processing of updating the print resolution in the scanning direction with the same value as the image resolution in the scanning direction (S7).

After the execution of the update processing (S7) of updating the print resolution in the conveyance direction or the scanning direction to have the same value as the image resolution, the controller 8 performs high resolution print processing of repeatedly performing the pass printing operation by the printing unit 6 and the conveyance operation of the paper 9 by the conveyance unit 7 based on the updated print resolution regarding one of the conveyance direction and the scanning direction and based on the print resolution stored preliminarily in the ROM 82 to be used for printing regarding the other direction, thereby printing the image 50 corresponding to the image data on the paper 9 (S8).

When the print resolution in the conveyance direction updated in the update processing (S7) is higher than the resolution in the conveyance direction defined by the interval between the nozzles 67, in the high resolution print processing (S8), the controller 8 controls the conveyance motor 33 such that the conveyance distance of the paper 9 along the conveyance direction in one conveyance operation is shorter than the distance d between two nozzles adjacent to each other along the conveyance direction (see FIG. 2). For example, when the updated print resolution in the conveyance direction is a third ($\frac{1}{3}$) of the inter-nozzle distance d, the conveyance distance of the paper 9 in one conveyance operation is set to a third ($\frac{1}{3}$) of the inter-nozzle distance d. This reduces the inter-dot distance of the ink along the conveyance direction on the paper 9, and thus the print resolution in the conveyance direction is increased and the print quality of the one-dimensional code image 100 in the conveyance direction can be secured.

In the high resolution print processing (S8), the controller 8 controls the carriage motor 31 such that the movement speed of the carriage 61 in a pass printing operation is reduced according to the increasing rate of the print resolution in the scanning direction updated in the update processing (S7). For example, when the print resolution in the scanning direction is updated from 300 dpi to 600 dpi, the movement speed of the carriage 61 is reduced to 50 percent. Assuming that the ink ejection cycle from the nozzles 67 is unchanged, this reduces the inter-dot distance of the ink on the paper 9 along the scanning direction, and thus the print resolution in the scanning direction is increased and the print quality of the one-dimensional code image 100 in the scanning direction can be secured.

After executing the normal print processing (S3) or the high resolution print processing (S8), the controller 8 executes discharge processing in which the paper 9 is discharged to the discharge tray 5 by the pair of discharge rollers 72 (S9). In this way, the printer 10 according to the first embodiment completes the operation of printing the image 50 on the paper 9.

According to this embodiment, when the image 50 to be printed on the paper 9 includes the one-dimensional code image 100, the print processing is performed after the print resolution is updated such that the print resolution in the facing direction in which the adjacent print regions 100a of the one-dimensional code image 100 face each other is the same as the image resolution of the image data. Thus, in contrast with the case in which the printing operation is performed without updating the print resolution, the dot interval does not increase in the facing direction of the adjacent print regions 100a. This prevents partial protrusion of the dot row from the position of the edge of the print region 100a which is caused by the image processing in the process of developing high resolution image data into low resolution print data. This suppresses differences in the ratio of widths of the print region 100a and the non-print region 100b of the one-dimensional code image 100 between the image data and the image that is actually printed, thereby securing the print quality of the one-dimensional code image 100.

According to this embodiment, the print quality of the one-dimensional code image 100 can be secured, both when the longitudinal direction of the one-dimensional code image 100 is parallel to the conveyance direction of the paper 9 and when the longitudinal direction of the one-dimensional code image 100 is perpendicular to the conveyance direction of the paper 9.

According to this embodiment, the print resolution in the facing direction of the adjacent print regions 100a is updated to be the same as the image resolution of the image data. In order to secure the print quality of the code image, it is required that the print resolution in the facing direction of the print regions of the code image be equal to or higher than the image resolution of the image data. On the other hand, the increase in the print resolution causes the decrease in the printing speed. The configuration of this embodiment suppresses the decrease in the printing speed while securing the print quality of the code image.

Second Embodiment

The above-described first embodiment is directed to the image data of the image 50 including the one-dimensional code image 100. However, the printer 10 according to the present disclosure also handles the image data of the image 50 including a two-dimensional code image 200. Hereinafter, a second embodiment will be described in which the image data of the image 50 including the two-dimensional code image 200 is targeted. Here, components having the same configurations as those of the first embodiment are designated by the same reference numerals, and the description thereof will be appropriately omitted.

Figure 6:
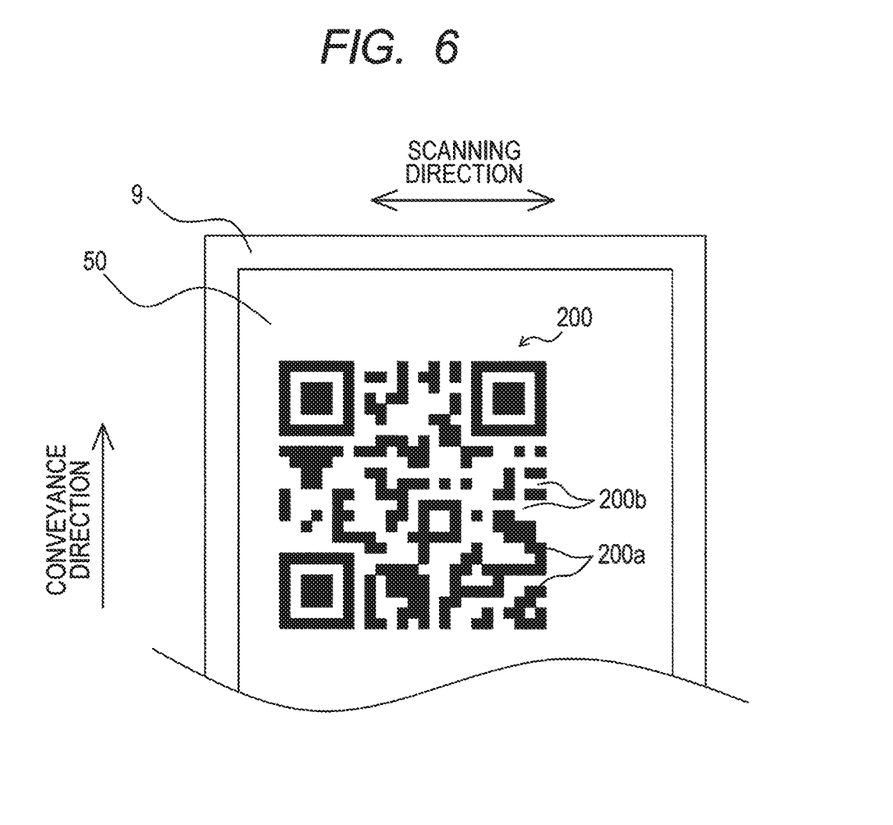
FIG. 6 is a diagram for illustrating a two-dimensional code image.

As shown in FIG. 6, the two-dimensional code image 200 is formed by arranging a plurality of square print regions 200a in a mosaic shape in a square area having sides extending in the conveyance direction and sides extending in the scanning direction. That is, the two-dimensional code image 200 has a pattern in which the print regions 200a and the non-print regions 200b are alternately formed in the conveyance direction and in the scanning direction. In the two-dimensional code image 200, the position where each print region 200a is arranged differs depending on the information to be displayed by the two-dimensional code image 200. The two-dimensional code image 200 shown in FIG. 6 is a QR Code™.

Figure 7:
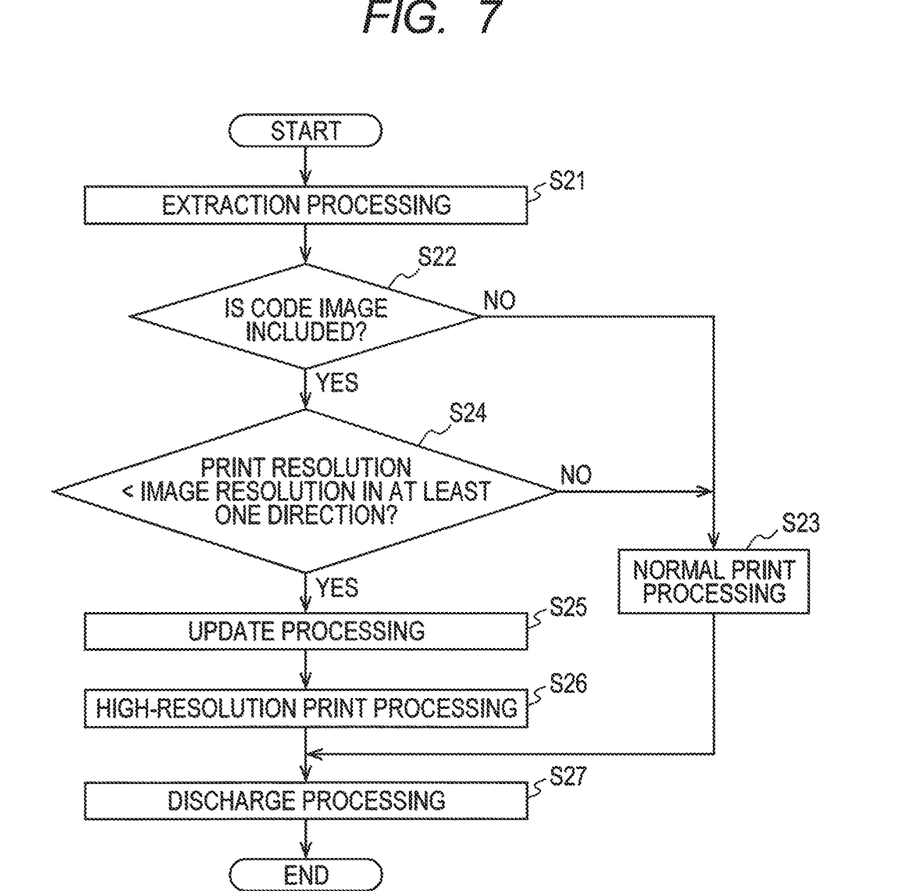
FIG. 7 is a flowchart showing the operations of an inkjet printer according to a second embodiment.

The operation of the printer 10 according to the second embodiment when printing the image 50 on paper 9 will be described with reference to the flowchart of FIG. 7. First, a print command relating to image data is supplied to the printer 10 based on an operation of an operation interface (not shown) of the printer 10 or the PC 20 by the user.

In response to this, the image data is supplied from the USB memory or the PC 20 to the printer 10 and is temporarily stored in the RAM 83. Note that, for each of the conveyance direction and the scanning direction, one print resolution included in the print command may be set as the print resolution to be used instead of the default value. The controller 8 executes extraction processing of extracting the image resolutions in the conveyance direction and in the scanning direction relating to the image data stored in the RAM 83 (S21). Subsequently, the controller 8 executes first determination processing of determining, based on the image data, whether the image 50 to be printed on the paper 9 includes the two-dimensional code image 200 (S22).

In response to determining that the image 50 to be printed on the paper 9 does not include the two-dimensional code image 200 (S22: NO), the controller 8 executes normal print processing for printing the image 50 corresponding to the image data on the paper 9 by repeatedly performing the pass printing operation by the printing unit 6 and the conveyance operation of the paper 9 by the conveyance unit 7, based on the print resolutions stored preliminarily in the ROM 82 for each of the conveyance direction and the scanning direction to be used for printing (S23).

In response to determining that a two-dimensional code image 200 is included in the image 50 to be printed on the paper 9 (S22: YES), the controller 8 executes the third determination processing of determining whether the print resolution in the conveyance direction stored preliminarily in the ROM 82 is lower than the image resolution in the conveyance direction extracted in the extraction processing in S21, or the print resolution in the scanning direction stored preliminarily in the ROM 82 is lower than the image resolution in the scanning direction extracted in the extraction processing in S21 (S24).

In response to determining that the print resolution in the conveyance direction is equal to or higher than the image resolution in the conveyance direction and the print resolution in the scanning direction is equal to or higher than the image resolution in the scanning direction (S24: NO), the controller 8 executes the normal print processing of repeatedly performing, based on the print resolutions stored preliminarily in the ROM 82, the pass printing operation by the printing unit 6 and the conveyance operation of the paper 9 by the conveyance unit 7, thereby printing the image 50 according to the image data on the paper 9 (S23). In response to determining that the print resolution in the conveyance direction is lower than the image resolution in the conveyance direction or the print resolution in the scanning direction is lower than the image resolution in the scanning direction (S24: NO), the controller 8 executes the update processing of updating one or both of the print resolution in the conveyance direction and the print resolution in the scanning direction that is determined to be lower than the image resolution to become the same value as the image resolution in the corresponding direction (S25). For example, when the print resolutions in the conveyance direction and the scanning direction are 600 dpi and 1200 dpi, respectively, and the image resolutions in the conveyance direction and the scanning direction are both 1200 dpi, the controller 8 updates (changes) the print resolution in the conveyance direction from 600 dpi to 1200 dpi and does not update (change) the print resolution in the scanning direction.

After the update processing (S25) is executed, the controller 8 performs high resolution print processing of repeatedly performing the pass printing operation by the printing unit 6 and the conveyance operation of the paper 9 by the conveyance unit 7 based on the updated print resolution regarding at least one of the conveyance direction and the scanning direction and based on the print resolution stored preliminarily in the ROM 82 to be used for printing regarding the other direction in a case where the print resolution in only one of the conveyance direction and the scanning direction has been updated, thereby printing the image 50 corresponding to the image data on the paper 9 (S26).

In the high resolution print processing (S26), the controller 8 controls the conveyance motor 33 in order to increase the print resolution in the conveyance direction and controls the carriage motor 31 in order to increase the print resolution in the scanning direction. The respective controls are similar to those of the above-described first embodiment and thus will not be described further.

After the normal print processing (S23) or the high resolution print processing (S26) is executed, the controller 8 executes the discharge processing of discharging the paper 9 to the discharge tray 5 by the pair of discharge rollers 72 (S27). With this operation, the operation of printing the image 50 on the paper 9 by the printer 10 according to the second embodiment is completed.

According to this embodiment, in a case where the image 50 to be printed on the paper 9 includes the two-dimensional code image 200, the print processing is executed after at least one of the print resolutions in the conveyance direction and in the scanning direction is updated (changed) to be the same as the corresponding image resolution such that both the print resolutions in the conveyance direction and in the scanning direction are equal to or higher than the corresponding image resolutions. Thus, in contrast with the case in which the print processing is performed without updating the print resolution, it can be prevented that the dot row (that is, the dot row X shown in FIG. 9B) having an increased dot interval protrudes from the print region 200a in the conveyance direction and in the scanning direction. This suppresses differences in the ratio of widths of the print region 200a and the non-print region 200b of the two-dimensional code image 200 between the image data and the image that is actually printed, thereby securing the print quality of the two-dimensional code image 200.

Modification

While the disclosure has been described in detail with reference to the above aspects thereof, it would be apparent to those skilled in the art that various changes and modifications may be made therein without departing from the scope of the claims.

Figure 8:
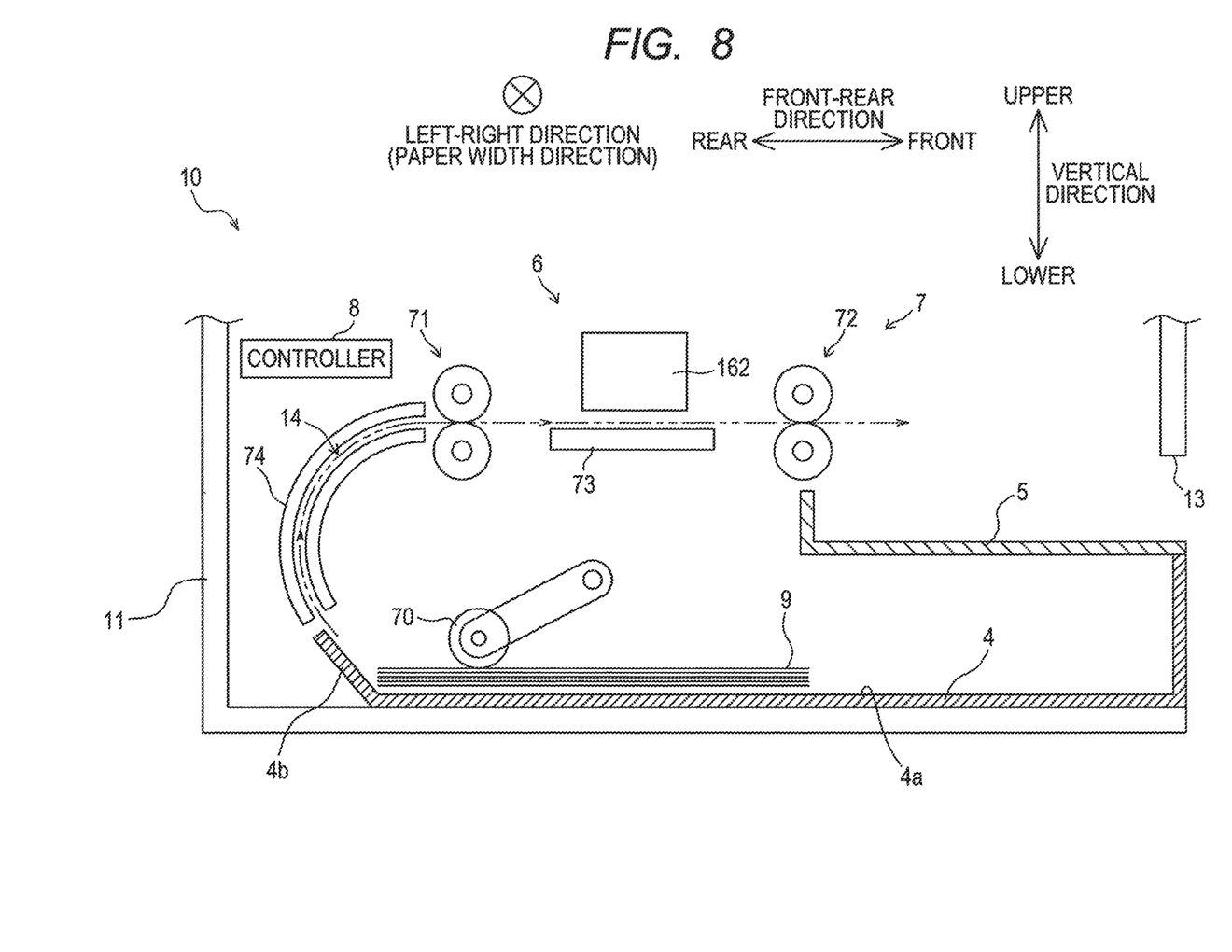
FIG. 8 is a schematic side view showing the internal structure of a printer having a line head according to a modification.

For example, in the above-described embodiment, the printer 10 is a serial printer including the carriage 61 that reciprocates in the scanning direction along the two guide rails 65a and 65b, the head 62 being mounted on the carriage 61. The present disclosure may also be applied to a line head printer (see FIG. 8) that includes a fixed line head 162 having a length greater than or equal to the width of the paper 9, and that prints an image by ejecting ink from the line head 162 while conveying the paper 9 in the conveyance direction. In the case of the line head printer, the print resolution in the conveyance direction can be increased by reducing the conveyance speed of the paper 9. Thus, when the facing direction of the adjacent print regions 100a of the one-dimensional code image 100 is the same as the conveyance direction, the print quality of the one-dimensional code image 100 can be secured by performing the print processing such that the print resolution in the conveyance direction is the same as the image resolution in the conveyance direction. On the other hand, the line head printer is different from the serial printer in that the line head printer cannot reduce the movement speed of the carriage 61 and cannot increase the print resolution in the scanning direction. Thus, when the facing direction of the adjacent print regions 100b in the one-dimensional code image 100 is the same as the scanning direction, the print processing cannot be performed such that the print resolution in the scanning direction is the same as the image resolution in the scanning direction. Specifically, in the case of the line head printer, the print quality of the one-dimensional code image 100 can be secured only when the facing direction of the adjacent print regions 100a in the one-dimensional code image 100 is the same as the conveyance direction. When the image 50 including the two-dimensional code image 200 is printed on the paper 9 by using the line head printer, the print quality of the two-dimensional code image 200 only in the conveyance direction can be secured. However, it may be insufficient from the viewpoint of securing the print quality of the entire two-dimensional code image 200. Thus, when the one-dimensional code image 100 is arranged in any direction or when the two-dimensional code image 200 is printed, it is preferable that the printer 10 is a serial printer in order to sufficiently secure the print quality of each code image.

In the first embodiment, the facing direction of the adjacent print regions 100a in the one-dimensional code image 100 is the same as one of the conveyance direction and the scanning direction (see FIGS. 4A and 4B). However, the facing direction of the adjacent print regions 100a in the one-dimensional code image 100 may be different from the conveyance direction and from the scanning direction. In this case, the controller 8 determines whether the print resolutions in the conveyance direction and the scanning direction stored preliminarily in the ROM 82 to be used for printing are lower than the image resolutions in the conveyance direction and the scanning direction extracted in the extraction processing (S1), respectively. In response to determining that both of the print resolutions in the conveyance direction and the scanning direction are lower than the extracted image resolutions in the conveyance direction and the scanning direction, the controller 8 executes the update processing of updating the print resolutions in the conveyance direction and the scanning direction to be the same as the image resolutions in the conveyance direction and the scanning direction, respectively. Note that, in response to determining that only one of the print resolutions in the conveyance direction and the scanning direction is lower than the image resolution in the corresponding direction, only one of the print resolutions in the conveyance direction or the scanning direction is updated to be the same as the image resolution in the corresponding direction, as in the first embodiment.

In the first embodiment, the controller 8 determines in the second determination processing (S4) whether the facing direction of the adjacent print regions 100a in the one-dimensional code image 100 is the same as the conveyance direction. Alternatively, the controller 8 may determine in the second determination processing whether the facing direction of the adjacent print regions 100a is the same as the scanning direction.

In the second embodiment, the two-dimensional code image 200 has a pattern in which the print regions 200a and the non-print regions 200b are alternately formed in each of the conveyance direction and the scanning direction. Alternatively, the two-dimensional code image 200 may have a pattern in which the print regions 200a and the non-print regions 200b are alternately formed in a direction inclined at a particular angle relative to the conveyance direction and a direction perpendicular to that direction. In the second embodiment, in response to determining in S22 that the code image is included (S22: YES), the third determination processing (S24) is executed without executing the second determination processing. However, the third determination processing may be executed after executing the second determination processing. In order to simplify the operation of the apparatus, the second determination processing may be omitted as in the second embodiment.

In the second embodiment, a QR Code™ is described as an example of the two-dimensional code image 200. However, the present disclosure is not limited to this. Specifically, the present disclosure may also be applied to another two-dimensional code image such as a data Matrix™.

In the first and second embodiments, the update processing is performed such that the print resolution is the same as the image resolution. Alternatively, the print resolution may be updated to be higher than the image resolution. However, in order to secure the print quality of the code image, it is sufficient that the print resolution is the same as the image resolution. Further, as the print resolution becomes higher, the printing speed becomes lower. Thus, in order to suppress the decrease of the printing speed while securing the print quality of the code image, it is preferable to update the print resolution to be the same as the image resolution.

In the above-described embodiment, the print resolution in the conveyance direction is increased by performing the conveyance operation such that the conveyance distance along the conveyance direction of the paper 9 is shorter than the distance d between two nozzles adjacent to each other along the conveyance direction (see FIG. 2). Further, the print resolution in the scanning direction is increased by reducing the movement speed of the carriage 61. However, other means may be used to increase the print resolution. For example, the print resolution may be adjusted by adjusting the timing at which ink is ejected through the nozzle 67 of the head 62, the size of dots, or landing positions, and so on.

In the above-described first and second embodiments, the controller 8 provided in the printer 10 executes the extraction processing, the first to third determination processing, the update processing, the normal print processing, the high resolution print processing, and so on, but the present disclosure is not limited to this. For example, a printer driver installed in the HDD of the PC 20 connected to the printer 10 or in the ROM of the mobile terminal may cause the PC 20 or the mobile terminal to execute some or all of these processing.

In the above-described embodiments, the present disclosure is applied to the printer 10, but the present disclosure is not limited to this. The present disclosure may also be applied to any inkjet printing apparatus that ejects ink from a head, such as a multifunction peripheral and a copier.

What is claimed is:

1. An inkjet printing apparatus comprising:
  a print engine including a head having a plurality of nozzles configured to eject ink, the print engine being configured to print an image on a recording medium by ejecting ink from the plurality of nozzles while the head moves relative to the recording medium;
  a memory configured to store image data and a print resolution in a first direction of an image to be printed on the recording medium; and
  a controller configured to:
    extract an image resolution in the first direction of image data stored in the memory;
    determine, based on the image data, whether a code image is included in an image to be printed on the recording medium, the code image being formed with a plurality of print regions and a plurality of non-print regions;
    in response to determining that the code image is included, determine whether the print resolution in the first direction stored in the memory is lower than the extracted image resolution in the first direction;
    in response to determining that the print resolution is lower than the extracted image resolution, update the print resolution in the first direction with a value equal to or higher than the extracted image resolution in the first direction; and
    control the print engine to print the image on the recording medium with the updated print resolution in the first direction.

2. The inkjet printing apparatus according to claim 1, wherein the controller is configured to:
  in response to determining that the code image is included, determine whether the first direction is same as a facing direction in which adjacent print regions in the code image face each other; and
  in response to determining that the first direction is same as the facing direction, determine whether the print resolution in the first direction is lower than the extracted image resolution in the first direction.

3. The inkjet printing apparatus according to claim 1, wherein the controller is configured to:
  in response to determining that the code image is included, update the print resolution in the first direction stored in the memory with a same value as the extracted image resolution in the first direction.

4. The inkjet printing apparatus according to claim 1, wherein the print engine includes:
  a conveyor configured to convey a recording; medium in a conveyance direction; and
  a carriage on which the head is mounted, the carriage being configured to reciprocate in a scanning direction perpendicular to the conveyance direction;
  wherein the conveyance direction is the first direction;
  wherein the plurality of nozzles is arranged at equal intervals along the conveyance direction; and
  wherein the controller is configured to, when the updated print resolution is higher than a resolution defined by intervals of the plurality of nozzles, perform printing such that a conveyance distance along the conveyance direction of the recording medium by the conveyor is shorter than a distance between two nozzles that are adjacent along the conveyance direction.

5. The inkjet printing apparatus according to claim 1, wherein the print engine includes:
  a conveyor configured to convey a recording medium in a conveyance direction; and
  a carriage on which the head is mounted, the carriage being configured to reciprocate in a scanning direction perpendicular to the conveyance direction;
  wherein the scanning direction is the first direction; and
  wherein the controller is configured to perform printing such that a movement speed of the carriage is decreased as the updated print resolution in the first direction is increased.

6. The inkjet printing apparatus according to claim 1, wherein the code image is a one-dimensional code image having a pattern in which a print region and a non-print region are formed alternately in a particular direction.

7. The inkjet printing apparatus according to claim 1, wherein the code image is a two-dimensional code image having a pattern in which a print region and a non-print region are formed alternately in each of two directions;
  wherein the memory further stores a print resolution in a second direction perpendicular to the first direction; and
  wherein the controller is configured to:
    extract an image resolution in the first direction and an image resolution in the second direction of the image data stored in the memory;
    determine whether the print resolution in the first direction is lower than the extracted image resolution in the first direction and whether the print resolution in the second direction is lower than the extracted image resolution in the second direction;
    in response to determining that at least one of the print resolutions in the first direction and in the second direction is lower than the extracted image resolution, update the at least one of the print resolutions with a value equal to or higher than the extracted image resolution in a corresponding direction of the first direction and the second direction; and
control the print engine to print the image on the recording medium with the updated print resolution.

8. The inkjet printing apparatus according to claim 1, wherein the print engine includes:
a conveyor configured to convey a recording medium in a conveyance direction; and
a carriage on Which the head is mounted, the carriage being configured to reciprocate in a scanning direction perpendicular to the conveyance direction;
wherein the code image is a one-dimensional code image having a pattern in which a print region and a non-print region are formed alternately in a facing direction; and
wherein the controller is configured to:
in response to determining that the code image is included, determine whether the facing direction is same as the conveyance direction;
in response to determining that the facing direction is same as the conveyance direction, determine whether the print resolution in the conveyance direction is lower than the image resolution in the conveyance direction;
in response to determining that the print resolution in the conveyance direction is lower than the image resolution in the conveyance direction, update the print resolution in the conveyance direction with a value equal to or higher than the image resolution in the conveyance direction and perform printing with the updated print resolution in the conveyance direction; and
in response to determining that the print resolution in the conveyance direction is equal to or higher than the image resolution in the conveyance direction, perform printing with the print resolution stored in the memory without updating the print resolution; and
in response to determining that the facing direction is different from the conveyance direction, determine whether the print resolution in the scanning direction is lower than the image resolution in the scanning direction;
in response to determining that the print resolution in the scanning direction is lower than the image resolution in the scanning direction, update the print resolution in the scanning direction with a value equal to or higher than the image resolution in the scanning direction and perform printing with the updated print resolution in the scanning direction; and
in response to determining that the print resolution in the scanning direction is equal to or higher than the image resolution in the scanning direction, perform printing with the print resolution stored in the memory without updating the print resolution.

9. The inkjet printing apparatus according to claim 1, wherein the print engine includes a conveyor configured to convey a recording medium in a conveyance direction;
wherein the head is a line head extending in a direction perpendicular to the conveyance direction;
wherein the code image is a one-dimensional code image having a pattern in which a print region and a non-print region are formed alternately in a facing direction; and
wherein the controller is configured to:
in response to determining that the code image is included, determine whether the facing direction is same as the conveyance direction;
in response to determining that the facing direction is same as the conveyance direction, determine whether the print resolution in the conveyance direction is lower than the image resolution in the conveyance direction;
in response to determining that the print resolution in the conveyance direction is lower than the image resolution in the conveyance direction, update the print resolution in the conveyance direction with a value equal to or higher than the image resolution in the conveyance direction and perform printing with the updated print resolution in the conveyance direction by controlling the conveyor to reduce a conveyance speed of the recording medium; and
in response to determining that the print resolution in the conveyance direction is equal to or higher than the image resolution in the conveyance direction, perform printing with the print resolution stored in the memory without updating the print resolution.

10. A non-transitory computer-readable storage medium storing a set of program instructions for a computer of an electronic device that controls an inkjet printing apparatus, the inkjet printing apparatus including a print engine including a head having a plurality of nozzles configured to eject ink, the print engine being configured to print an image on a recording medium by ejecting ink from the plurality of nozzles while the head moves relative to the recording medium, the set of program instructions, when executed by the computer, causing the electronic device to:
extract an image resolution in a first direction of image data stored in a memory of the electronic device;
determine, based on the image data, whether a code image is included in an image to be printed on the recording medium, the code image being formed with a plurality of print regions and a plurality of non-print regions;
in response to determining that the code image is included, determine whether a print resolution in the first direction stored in the memory is lower than the extracted image resolution in the first direction;
in response to determining that the print resolution is lower than the extracted image resolution, update the print resolution in the first direction with a value equal to or higher than the extracted image resolution in the first direction; and
control the print engine to print the image on the recording medium with the updated print resolution in the first direction.

11. The non-transitory computer-readable storage medium according to claim 10, wherein the set of program instructions, when executed by the computer, causes the electronic device to:
in response to determining that the code image is included, determine whether the first direction is same as a facing direction in which adjacent print regions in the code image face each other; and
in response to determining that the first direction is same as the facing direction, determine whether the print resolution in the first direction is lower than the extracted image resolution in the first direction.

12. The non-transitory computer-readable storage medium according to claim 10, wherein the set of program instructions, when executed by the computer, causes the electronic device to:
in response to determining that the code image is included, update the print resolution in the first direction stored in the memory with a same value as the extracted image resolution in the first direction.

13. The non-transitory computer-readable storage medium according to claim 10, wherein the print engine includes: a conveyor configured to convey a recording medium in a conveyance direction; and a carriage on which the head is mounted, the carriage being configured to reciprocate in a scanning direction perpendicular to the conveyance direction;
wherein the conveyance direction is the first direction;
wherein the plurality of nozzles is arranged at equal intervals along the conveyance direction; and
wherein the set of program instructions, when executed by the computer, causes the electronic device to:
when the updated print resolution is higher than a resolution defined by intervals of the plurality of nozzles, perform printing such that a conveyance distance along the conveyance direction of the recording medium by the conveyor is shorter than a distance between two nozzles that are adjacent along the conveyance direction.

14. The non-transitory computer-readable storage medium according to claim 10, wherein the print engine includes: a conveyor configured to convey a recording medium in a conveyance direction; and a carriage on which the head is mounted, the carriage being configured to reciprocate in a scanning direction perpendicular to the conveyance direction;
wherein the scanning direction is the first direction; and
wherein the set of program instructions, when executed by the computer, causes the electronic device to:
perform printing such that a movement speed of the carriage is decreased as the updated print resolution in the first direction is increased.

15. The non-transitory computer-readable storage medium according to claim 10, wherein the code image is a one-dimensional code image having a pattern in which a print region and a non-print region are formed alternately in a particular direction.

16. The non-transitory computer-readable storage medium according to claim 10, wherein the code image is a two-dimensional code image having a pattern in which a print region and a non-print region are formed alternately in each of two directions;
wherein the memory further stores a print resolution in a second direction perpendicular to the first direction; and
wherein the set of program instructions, when executed by the computer, causes the electronic device to:
extract an image resolution in the first direction and an image resolution in the second direction of the image data stored in the memory;
determine whether the print resolution in the first direction is lower than the extracted image resolution in the first direction and whether the print resolution in the second direction is lower than the extracted image resolution in the second direction;
in response to determining that at least one of the print resolutions in the first direction and in the second direction is lower than the extracted image resolution, update the at least one of the print resolutions with a value equal to or higher than the extracted image resolution in a corresponding direction of the first direction and the second direction; and
control the print engine to print the image on the recording medium with the updated print resolution.

17. The non-transitory computer-readable storage medium according to claim 10, wherein the print engine includes: a conveyor configured to convey a recording medium in a conveyance direction; and a carriage on which the head is mounted, the carriage being configured to reciprocate in a scanning direction perpendicular to the conveyance direction;
wherein the code image is a one-dimensional code image having a pattern in which a print region and a non-print region are formed alternately in a facing direction; and
wherein the set of program instructions, when executed by the computer, causes the electronic device to:
in response to determining that the code image is included, determine whether the facing direction is same as the conveyance direction;
in response to determining that the facing direction is same as the conveyance direction, determine whether the print resolution in the conveyance direction is lower than the image resolution in the conveyance direction;
in response to determining that the print resolution in the conveyance direction is lower than the image resolution in the conveyance direction, update the print resolution in the conveyance direction with a value equal to or higher than the image resolution in the conveyance direction and perform printing with the updated print resolution in the conveyance direction; and
in response to determining that the print resolution in the conveyance direction is equal to or higher than the image resolution in the conveyance direction, perform printing with the print resolution stored in the memory without updating the print resolution; and
in response to determining that the facing direction is different from the conveyance direction, determine whether the print resolution in the scanning direction is lower than the image resolution in the scanning direction;
in response to determining that the print resolution in the scanning direction is lower than the image resolution in the scanning direction, update the print resolution in the scanning direction with a value equal to or higher than the image resolution in the scanning direction and perform printing with the updated print resolution in the scanning direction; and
in response to determining that the print resolution in the scanning direction is equal to or higher than the image resolution in the scanning direction, perform printing with the print resolution stored in the memory without updating the print resolution.

18. The non-transitory computer-readable storage medium according to claim 10, wherein the print engine includes a conveyor configured to convey a recording medium in a conveyance direction;
wherein the head is a line head extending in a direction perpendicular to the conveyance direction;
wherein the code image is a one-dimensional code image having a pattern in which a print region and a non-print region are formed alternately in a facing direction; and
wherein the set of program instructions, when executed by the computer, causes the electronic device to:
in response to determining that the code image is included, determine whether the facing direction is same as the conveyance direction;

in response to determining that the facing direction is same as the conveyance direction, determine whether the print resolution in the conveyance direction is lower than the image resolution in the conveyance direction;

in response to determining that the print resolution in the conveyance direction is lower than the image resolution in the conveyance direction, update the print resolution in the conveyance direction with a value equal to or higher than the image resolution in the conveyance direction and perform printing with the updated print resolution in the conveyance direction by controlling the conveyor to reduce a conveyance speed of the recording medium; and in response to determining that the print resolution in the conveyance direction is equal to or higher than the image resolution in the conveyance direction, perform printing with the print resolution stored in the memory without updating the print resolution.

* * * * *